(12) United States Patent　　(10) Patent No.:　　US 9,010,585 B1
Schultz　　(45) Date of Patent:　　Apr. 21, 2015

(54) DRY INGREDIENT DISPENSING UNIT

(71) Applicant: Kenneth D. Schultz, Tyndall (CA)

(72) Inventor: Kenneth D. Schultz, Tyndall (CA)

( * ) Notice: Subject to any disclaimer, the term of this patent is extended or adjusted under 35 U.S.C. 154(b) by 0 days.

(21) Appl. No.: 14/096,658

(22) Filed: Dec. 4, 2013

Related U.S. Application Data

(60) Provisional application No. 61/886,305, filed on Oct. 3, 2013.

(51) Int. Cl.
| | | |
|---|---|---|
| B65D 88/54 | (2006.01) | |
| B67D 7/84 | (2010.01) | |
| B67D 7/70 | (2010.01) | |
| A47B 67/02 | (2006.01) | |
| A47B 96/06 | (2006.01) | |
| A01G 27/00 | (2006.01) | |
| B65G 11/18 | (2006.01) | |

(52) U.S. Cl.
CPC .................................. B65G 11/186 (2013.01)

(58) Field of Classification Search
USPC .............. 222/284, 285, 288, 132, 134, 129.4, 222/135, 267, 361, 254, 278, 160, 185.1, 222/166, 433, 436, 453; 312/242, 245; 248/205.1, 229.11, 229.22, 228.5, 248/231.41, 244, 298.1, 307, 235, 242, 241, 248/250, 295.11, 279.1, 223.41, 225.11; 221/186; 239/74, 71, 67
See application file for complete search history.

(56) References Cited

U.S. PATENT DOCUMENTS

| | | | | |
|---|---|---|---|---|
| 1,584,878 | A * | 5/1926 | McQuarrie | 222/288 |
| 2,781,955 | A * | 2/1957 | Kidd | 222/436 |
| 3,227,313 | A * | 1/1966 | Morena | 222/57 |
| 4,618,075 | A | 10/1986 | Hampton | |
| 4,998,647 | A * | 3/1991 | Sharp | 222/143 |
| 5,143,262 | A * | 9/1992 | Edlund | 222/129 |
| 6,006,657 | A * | 12/1999 | Ikuta | 99/331 |
| 6,152,020 | A * | 11/2000 | Ikuta | 99/352 |
| 6,991,134 | B2 | 1/2006 | Bailey | |
| 7,753,206 | B2 | 7/2010 | Sawhney et al. | |
| 8,336,377 | B2 | 12/2012 | Robbins | |

* cited by examiner

*Primary Examiner* — Kevin P Shaver
*Assistant Examiner* — Stephanie E Williams
(74) *Attorney, Agent, or Firm* — Robert C. Montgomery; Montgomery Patent + Design

(57) ABSTRACT

A dry ingredient dispensing unit includes a plurality of containers affixed to a sliding rail mountable to a structure such as a cupboard. Each container is configured into a hopper. A volume of a dry ingredient is loaded through a top portion of each hopper. Each hopper is provided with a plurality of sliding dispensing plates stacked on top of each other. Each dispensing plate is provided with a calibrated aperture to dispense a specific volume of dry ingredient when the plate is slid outward from the hopper. Further, the hoppers are interconnected to provide an assembly of multiple compartments.

17 Claims, 7 Drawing Sheets

DRY INGREDIENT DISPENSING UNIT

RELATED APPLICATIONS

The present invention was first described in and claims the benefit of U.S. Provisional Application No. 61/886,305, filed Oct. 3, 2013, the entire disclosures of which are incorporated herein by reference.

FIELD OF THE INVENTION

The present invention relates generally to a dispensing system including a plurality of containers affixed to a sliding rail mountable to a structure such as a cupboard. Each container comprises a hopper, a plurality of sliding dispensing plates each having a different calibrated aperture to dispense a corresponding volume of a dry ingredient housed within.

BACKGROUND OF THE INVENTION

There are a great many of everyday items that are used in a powdered or granular form. The kitchen is home to flour, sugar, spices, herbs, seasoning, and other ingredients that are sold in boxes, bottles, and jars. The laundry room is home to soap powder, washing detergent, home cleaners, and other items that are only available in powdered or granular form. All of these materials must be stored in a location where they can be conveniently accessed for the task at hand. Then, each of these containers must be accessed with a scoop, or other measuring device to ensure that the proper amount of material is being used. This then requires the scoop to be cleaned and stored as well. Accordingly, there exists a need for a means by which powdered and granular material can be easily stored and measured for use, without the disadvantages as described above.

SUMMARY OF THE INVENTION

The disadvantages of the prior art are overcome by the present invention in providing a dry ingredient dispensing unit that includes a plurality of hoppers that are affixed to a sliding rail which is mountable to a structure such as a cupboard. A volume of a dry ingredient is loaded through a top portion into each hopper. Each hopper is provided with a plurality of sliding dispensing plates stacked on top of each other. Each dispensing plate is provided with a calibrated aperture to dispense a specific volume of dry ingredient when the plate is slid outward from the hopper. To provide different volumes of dry ingredients the dispensing plates may be opened individually or in combinations. Further, the hoppers are interconnected to provide an assembly of multiple dry ingredient storage. In this manner, the use of the present invention allows for the storage and dispensing of powdered or granular ingredients, which is not only quick, easy, and effective, but convenient as well.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
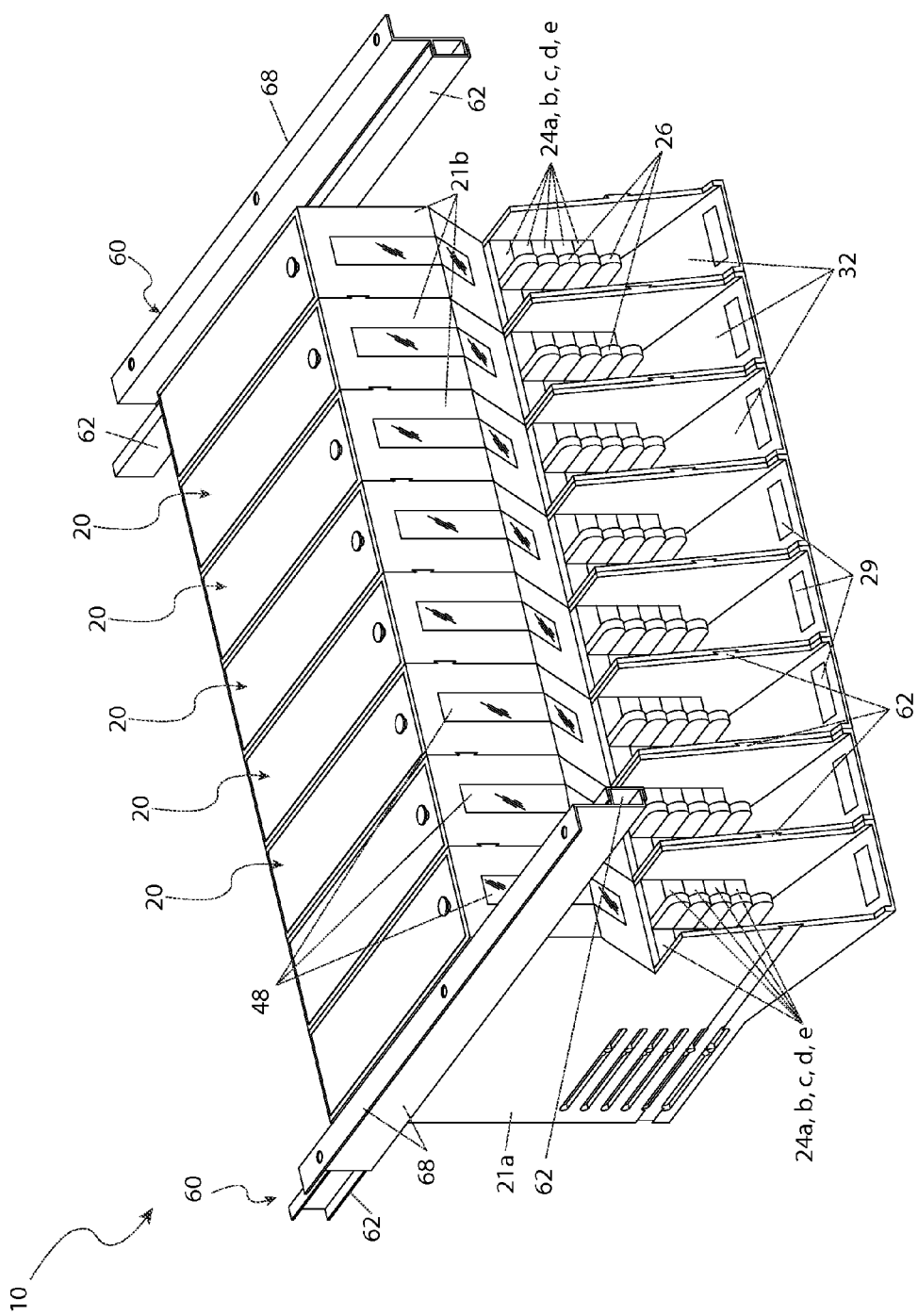
FIG. 1 is a perspective view of a dry ingredient dispenser assembly 10 showing a plurality of interconnected hopper assemblies 20, according to a preferred embodiment of the present invention.
Figure 2:
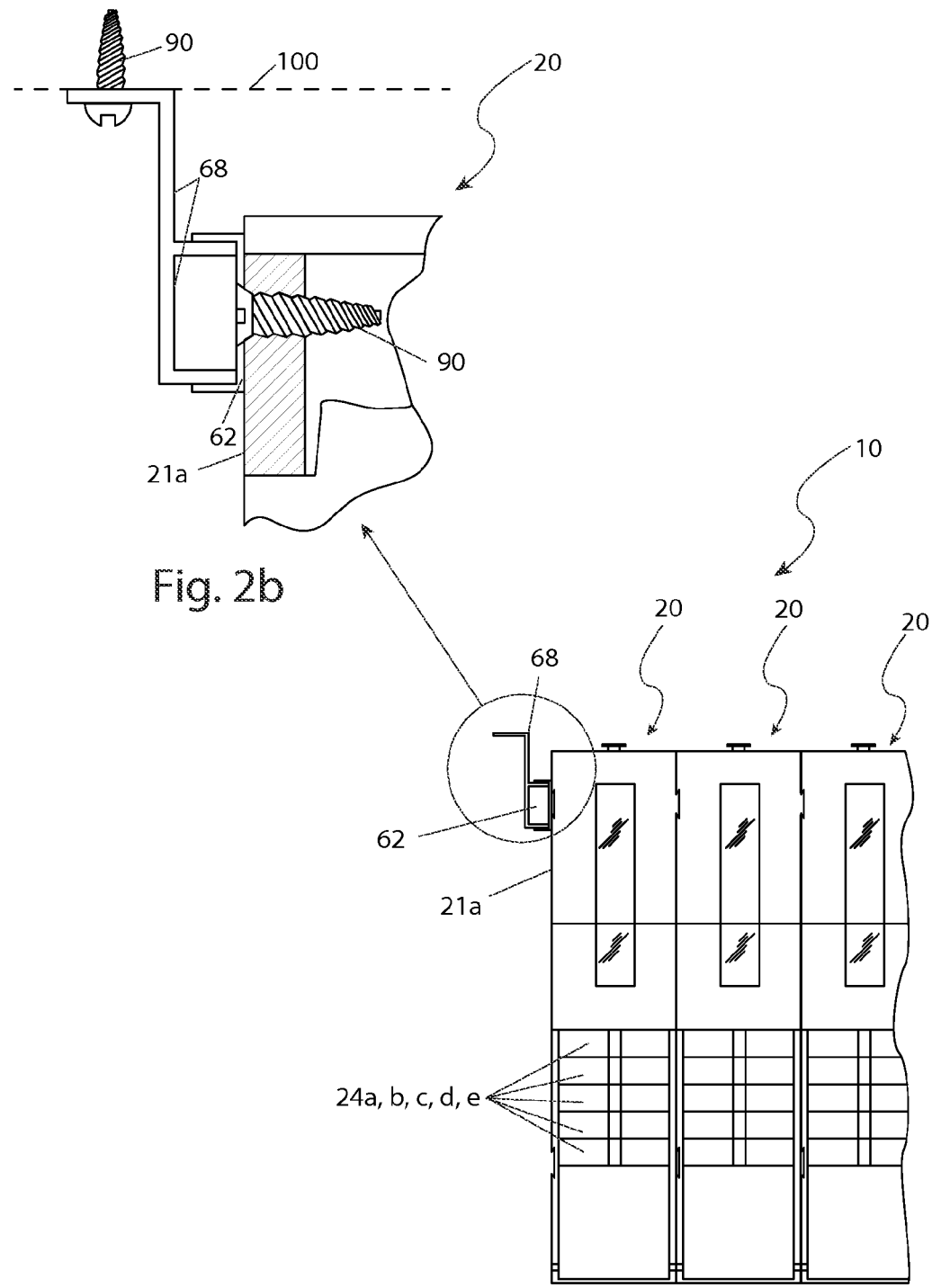
FIG. 2a is a front view of a mounting bracket 68, according to a preferred embodiment of the present invention.
FIG. 2b is a section view of the mounting bracket 68, according to a preferred embodiment of the present invention.

DESCRIPTIVE KEY 10 dry ingredient dispenser assembly
20 hopper assembly
21a side panel
21b front panel
21c rear panel
21d bottom panel
24a first dispensing plate
24b second dispensing plate
24c third dispensing plate
24d fourth dispensing plate
24e fifth dispensing plate
25a first aperture
25b second aperture
25c third aperture
25d fourth aperture
25e fifth aperture
26 handle
27 center opening
28 indicia
29 label
30 hopper structure
31 hopper floor
32 delivery chute
34 lid
35 knob
36 guide pin
37 stop button
38 hinge
40a upper joint slot
40b lower joint slot
42a upper joint tab
42b lower joint tab
44 guide slot
46 stop slot
48 window
60 mounting assembly
62 slide
68 mounting bracket
90 fastener
100 cupboard structure

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a dry ingredient dispenser assembly (herein described as the "assembly") 10, which provides an assembly 10 to store and dispense various powdered and/or granular dry ingredients 102. The assembly 10 is envisioned being introduced in different sizes which correspond to families of dry ingredients 102, each comprising a plurality of identical hopper assemblies 20 especially beneficial when joined together and mounted below a kitchen or laundry room cupboard structure. The assembly 10 is suitable for holding and accurately dispensing various granular dry ingredients 102 such as spices, salt, flour, sugar, powdered laundry detergent, granular cleaning agents, and the like.

Referring now to FIG. 1, a perspective view of the assembly 10, according to the preferred embodiment of the present invention, is disclosed. The assembly 10 is configured here having a plurality of joined hopper assemblies 20, each having a series of dispensing plates 24a, 24b, 24c, 24d, 24e being accessible from a front panel 21b. Each dispensing plate 24a, 24b, 24c, 24d, 24e, in turn comprises a corresponding graduated aperture 25a, 25b, 25c, 25d, 25e (see FIGS. 3 and 4). A user would simply extend a handle portion 26 of at least one (1) dispensing plate 24a, 24b, 24c, 24d, 24e to dispense a desired quantity of pre-loaded dry ingredient 102 into a subjacent downwardly angled delivery chute portion 32 for subsequent capture and use. The dispensing process may be repeated as necessary to obtain a desired quantity of the dry ingredient. It is envisioned that each hopper assembly 20 comprises an ingredient identifying label 29 being adhesively or otherwise affixed upon the delivery chute 32 or other easily observable surface.

Figure 5:
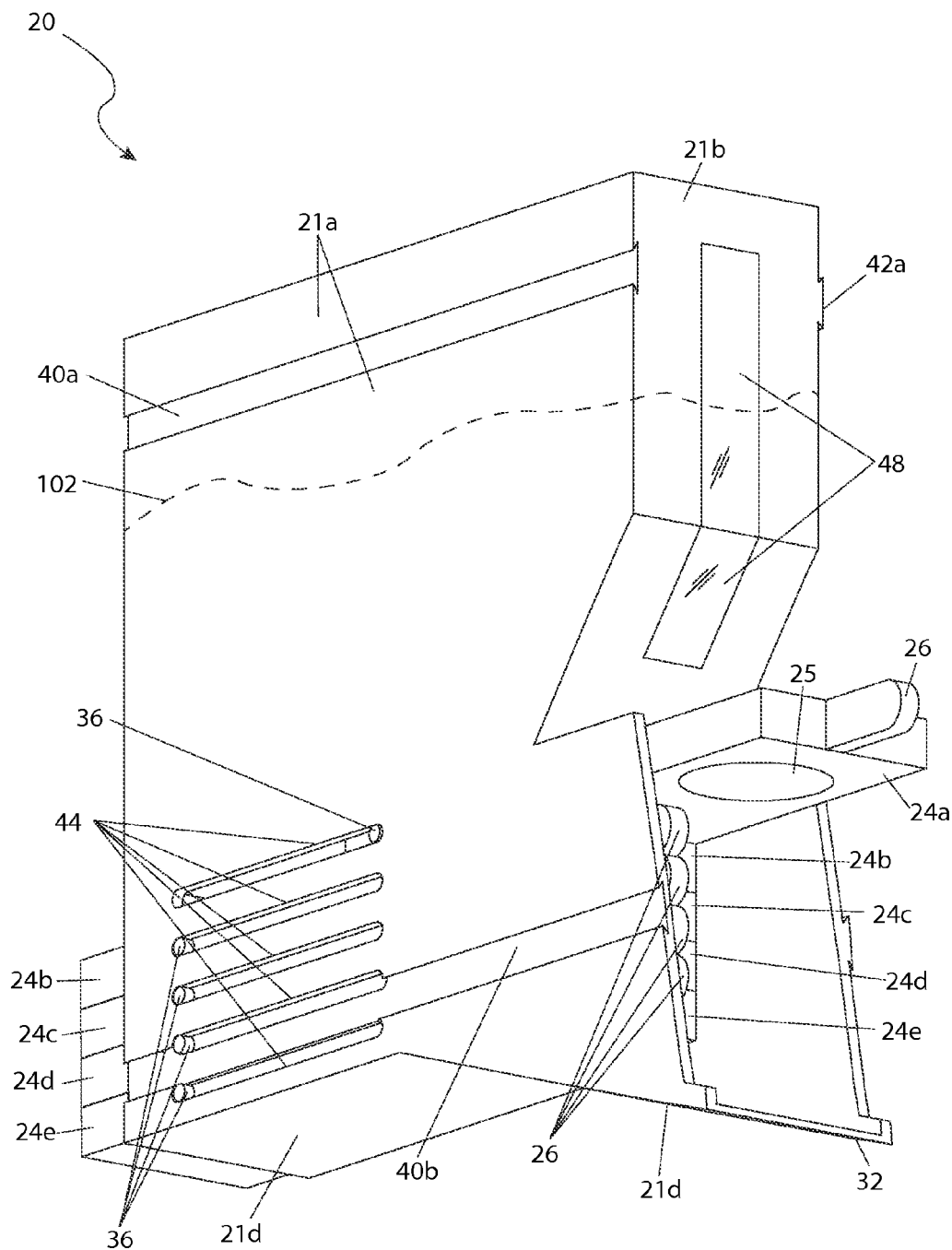
FIG. 5 is an upward-looking perspective view of the hopper assembly 20, according to a preferred embodiment of the present invention.
Figure 6:
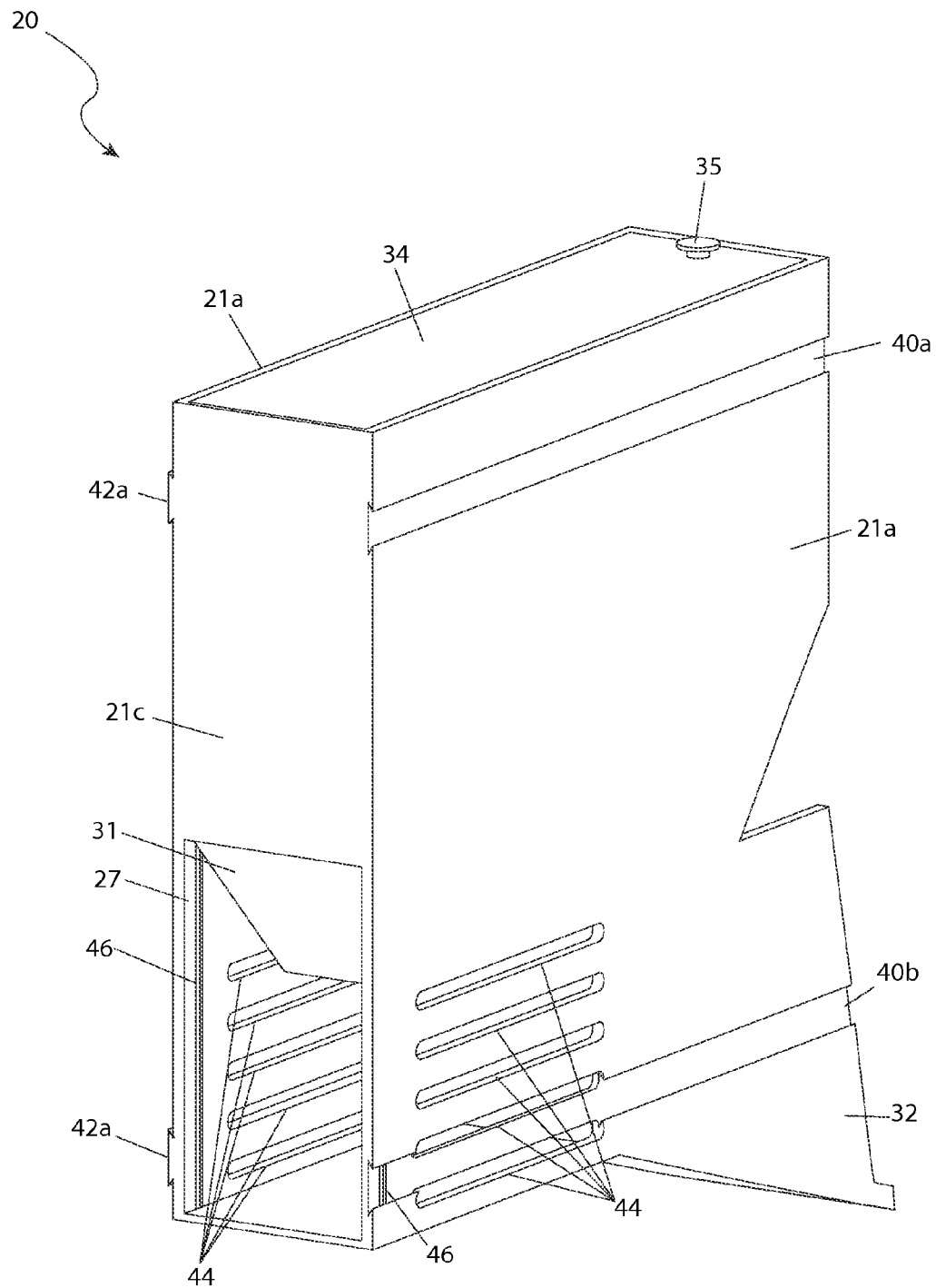
FIG. 6 is a rear perspective view of the hopper assembly 20, according to a preferred embodiment of the present invention; and, FIG. 7 is a close-up view of a dispenser plate portion 24a of the dry ingredient dispenser 10, according to a preferred embodiment of the present invention.

The assembly 10 provides a means to slidingly join a desired number of hopper assemblies 20 together via integral "dove-tail-like" features to form an attractive dispensing unit (see also FIGS. 5 and 6). The assembled hopper assemblies 20 are to be affixed to an existing cupboard structure 100 via an extendable mounting assembly 60 that allows one (1) or more hopper assemblies 20 to be pulled outwardly from a recessed location below the cupboard structure 100 for convenient dispensing or refilling of the dry ingredients 102 (see FIGS. 2a and 2b).

The assembly 10 is attached to and supported by a cupboard structure 100 via the mounting assembly 60 further comprising interlocking slide 62 and mounting bracket 68 portions. The slide portion 62 is affixed to those hopper assemblies 20 located at opposing ends of the assembly, and in turn interconnected to respective mounting bracket portions 68 which provide a means of stationary attachment to the cupboard structure 100 (see FIGS. 2a and 2b).

Referring now to FIGS. 2a and 2b, front and sectional views of the mounting bracket portion 68 of the assembly 10, according to a preferred embodiment of the present invention, is disclosed. The mounting bracket 68 and slider 62 portions of the assembly 10 are envisioned to provide similar construction and function as a common drawer slide mechanism. The mounting bracket 68 comprises an "L"-shaped sheet metal detail including a horizontal top surface portion which may be affixed to a bottom surface portion of a cupboard structure 100 or similar object using a plurality of fasteners 90. A bottom portion of the mounting bracket 68 includes a "U"-shaped feature providing parallel sliding surfaces which are inserted within matching features of the slider 62 to provide parallel bearing surfaces for smooth extension of the hopper assemblies 20 toward a user for filling, dispensing, or cleaning, as needed. The sliders 62 are affixed to an upper edge portion of side panel portions 21a of the hopper assemblies 20 also using fasteners 90 such as screws, rivets, or the like.

Figure 3:
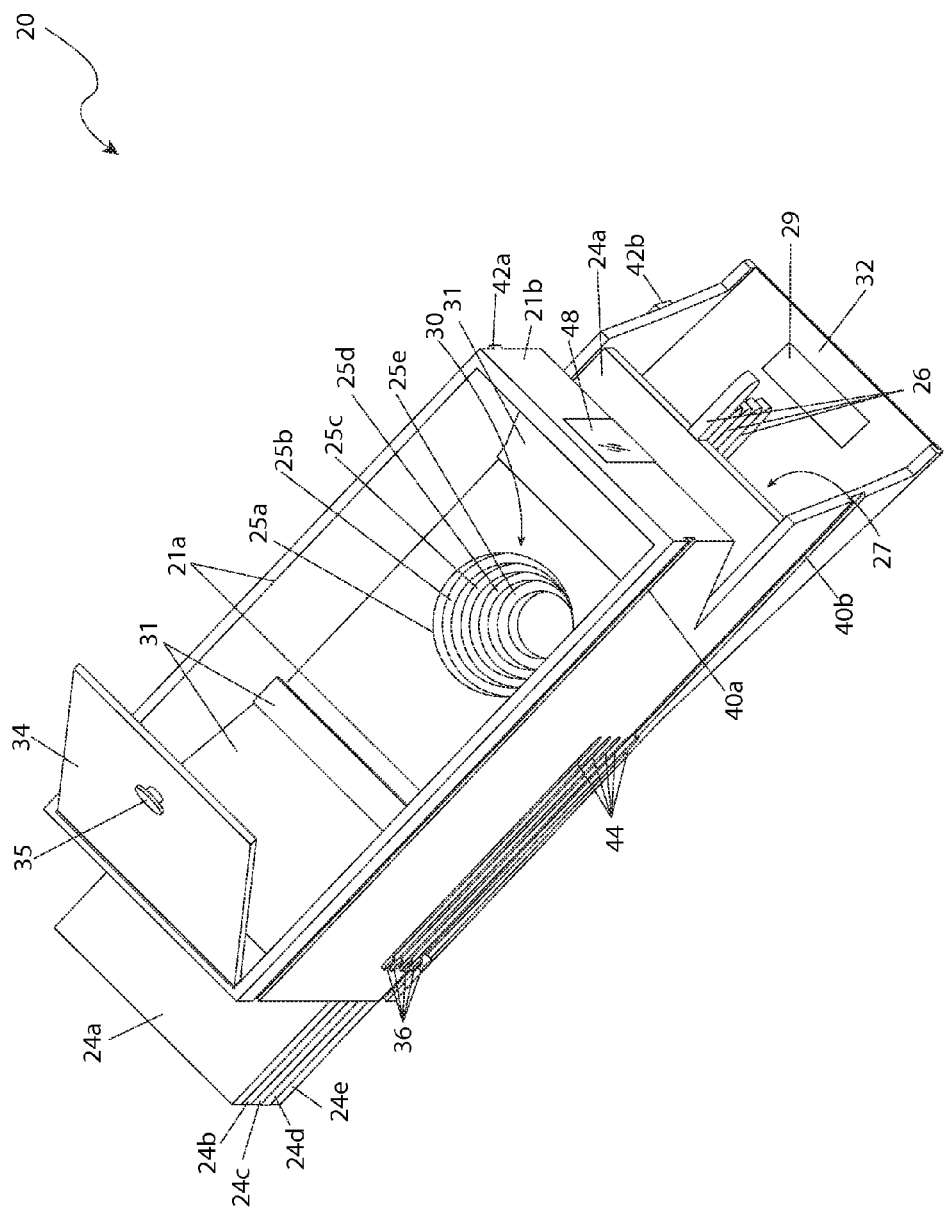
FIG. 3 is a top perspective view of an individual hopper assembly 20, according to a preferred embodiment of the present invention.
Figure 4:
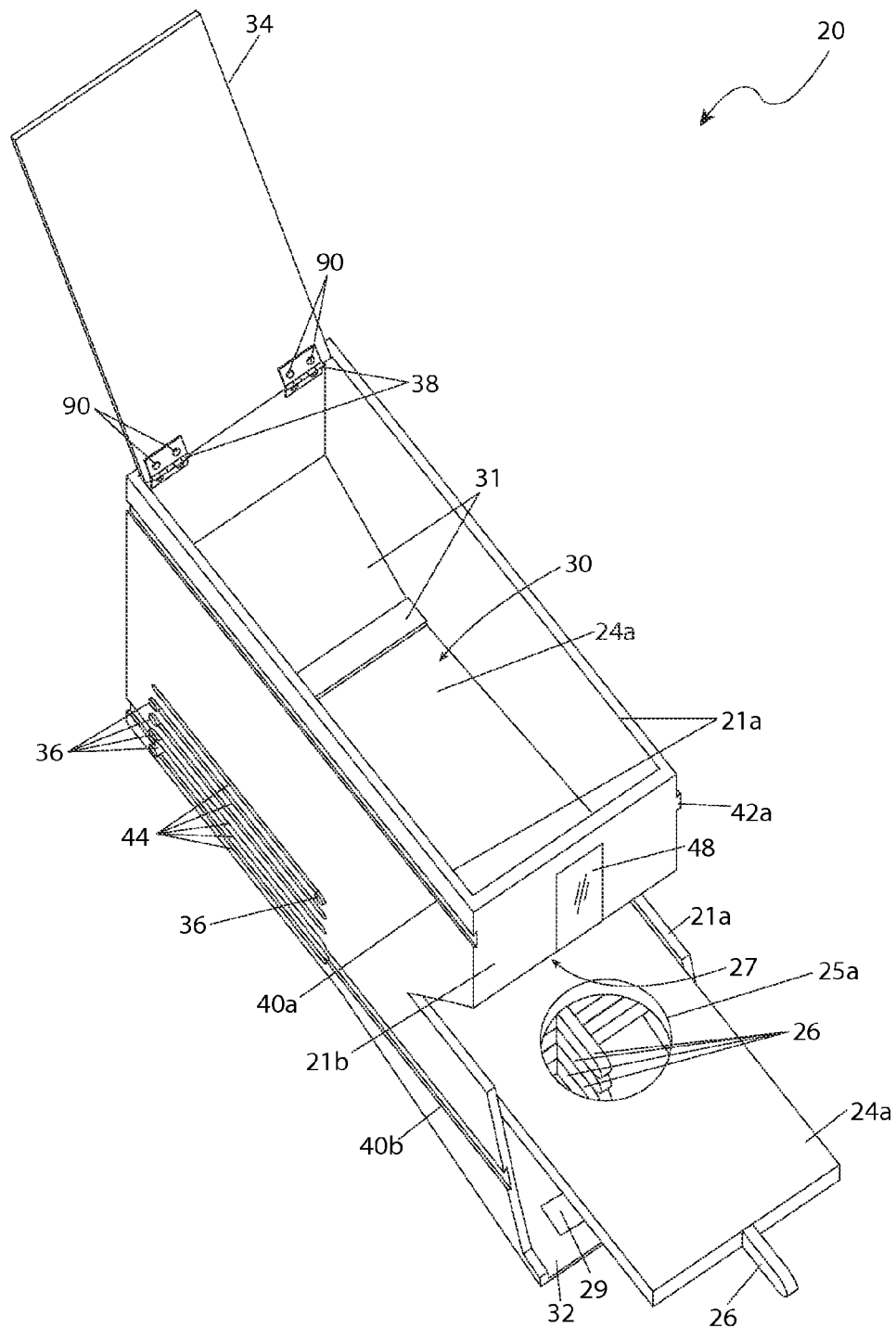
FIG. 4 is another top perspective view of the hopper assembly 20 depicting deployment of a dispensing plate 24a, according to a preferred embodiment of the present invention.

Referring now to FIGS. 3 through 6, perspective views of a hopper assembly portion 20 of the assembly 10, according to a preferred embodiment of the present invention, are disclosed. The hopper assembly 20 comprises a hollow box-like structure made of plastic, metal, wood, or the like, comprising a top hopper structure 30, a center opening 27 suitable for insertion of a plurality of dispensing plates 24a, 24b, 24c, 24d, 24e, and a bottom forwardly extending delivery chute 32. The hopper assembly 20 further comprises opposing side panels 21a, a front panel 21b, a rear panel 21c, and a bottom panel 21d. Each hopper structure 30 comprises a hollow downwardly tapering form having open bottom and top portions. The hopper structure 30 also includes a downwardly angled hopper floor portion 31 which spans between interior sides of the side panel portions 21a of the hopper assembly 20 to allow downward flow of the dry ingredients 102 as they are dispensed. The open bottom portion of the hopper structure 30 is occupied by the series of slidingly stacked dispensing plates 24a, 24b, 24c, 24d, 24e including a first dispensing plate 24a, a second dispensing plate 24b, a third dispensing plate 24c, a fourth dispensing plate 24d, and a fifth dispensing plate 24e. The dispensing plates 24a, 24b, 24c, 24d, 24e comprise flat rectangular forms made using a similar material as the hopper structure 30 and having identical perimeter shapes. The dispensing plates 24a, 24b, 24c, 24d, 24e comprise integral diametrically decreasing and graduated circular apertures 25a, 25b, 25c, 25d, 25e including a first aperture 25a, a second aperture 25b, a third aperture 25c, a fourth aperture 25d, and a fifth aperture 25e as seen in FIG. 3. The top first dispensing plate 24a comprises the largest first aperture 25a while the bottom fifth dispensing plate 24e comprises a smallest fifth aperture 25e. Said dispensing plates 24a, 24b, 24c, 24d, 24e are in turn supported from below by the bottom panel portion 21d of the hopper assembly 20 as seen in FIG. 5.

Upon filling the hopper structure portion 30 of the hopper assembly 20 with a dry ingredient, the subjacent apertures 25a, 25b, 25c, 25d, 25e are coincidentally filled as illustrated in FIG. 3. The apertures 25a, 25b, 25c, 25d, 25e constitute a particular volume of ingredient, therefore as one (1) or more dispensing plates 24a, 24b, 24c, 24d, 24e are extended, they release a corresponding amount of the dry ingredient 102 downward onto the delivery chute 32 for use by the user.

Each dispensing plate 24a, 24b, 24c, 24d, 24e is slidingly guided in a horizontal direction within the center opening 27 via integral guide pins 36 which travel within corresponding guide slots 44 formed through the side panels 21a of the hopper assembly 20. Said guide slots 44 are arranged in a parallel manner as best illustrated in FIG. 5. Additionally, said dispensing plates 24a, 24b, 24c, 24d, 24e are retained at their fully inserted positions via a pair of vertical stop slots 46 formed within rearward inner surfaces of the side panels 21 as best illustrated in FIG. 6. Each dispensing plate 24a, 24b, 24c, 24d, 24e comprises a pair of corresponding stop buttons 37 which engage said stop slots 46 upon complete insertion of each dispensing plate 24a, 24b, 24c, 24d, 24e (also see FIG. 7).

The assembly 10 provides an attachment means between each hopper assembly 20 via "dove-tail-type" features which allow a user to join a plurality of hopper assemblies 20 together in a compact and attractive manner (see FIG. 1). Each hopper assembly 20 comprises an upper joint slot 40a and a lower joint slot 40b along respective top and bottom edges of one (1) side panel 21a, and an upper joint tab 42a and a lower joint tab 42b along respective top and bottom edges of the opposing side panel portion 21a. Said joint slots 40a, 40b and joint tabs 42a, 42b comprise respective interlocking female and male features being correspondingly positioned and sized to provide interlocking engagement and smooth relative motioning of adjacent hopper assemblies 20 in forward and rearward directions.

Each hopper assembly 20 comprises a lid 34 and a transparent plastic window 48. The lid 34 provides top access into the hopper structure 30 and comprises a flat rectangular form made of a similar material as the hopper structure 30. Said lid 34 further comprises a knob 35 along a forward edge for manual opening of the lid 34, and a pair of hinges 38 along a rearward edge being affixed using a plurality of fasteners 90. The hinges 38 provide pivoting attachment of the lid 34 to the hopper structure 30 for convenient refilling of the dry ingredient, disposed preferably in a central vertical position. The window 48 is preferably integrally-molded into the front panel 21b, thereby allowing a user to observe current levels of the contained dry ingredient.

Figure 7:
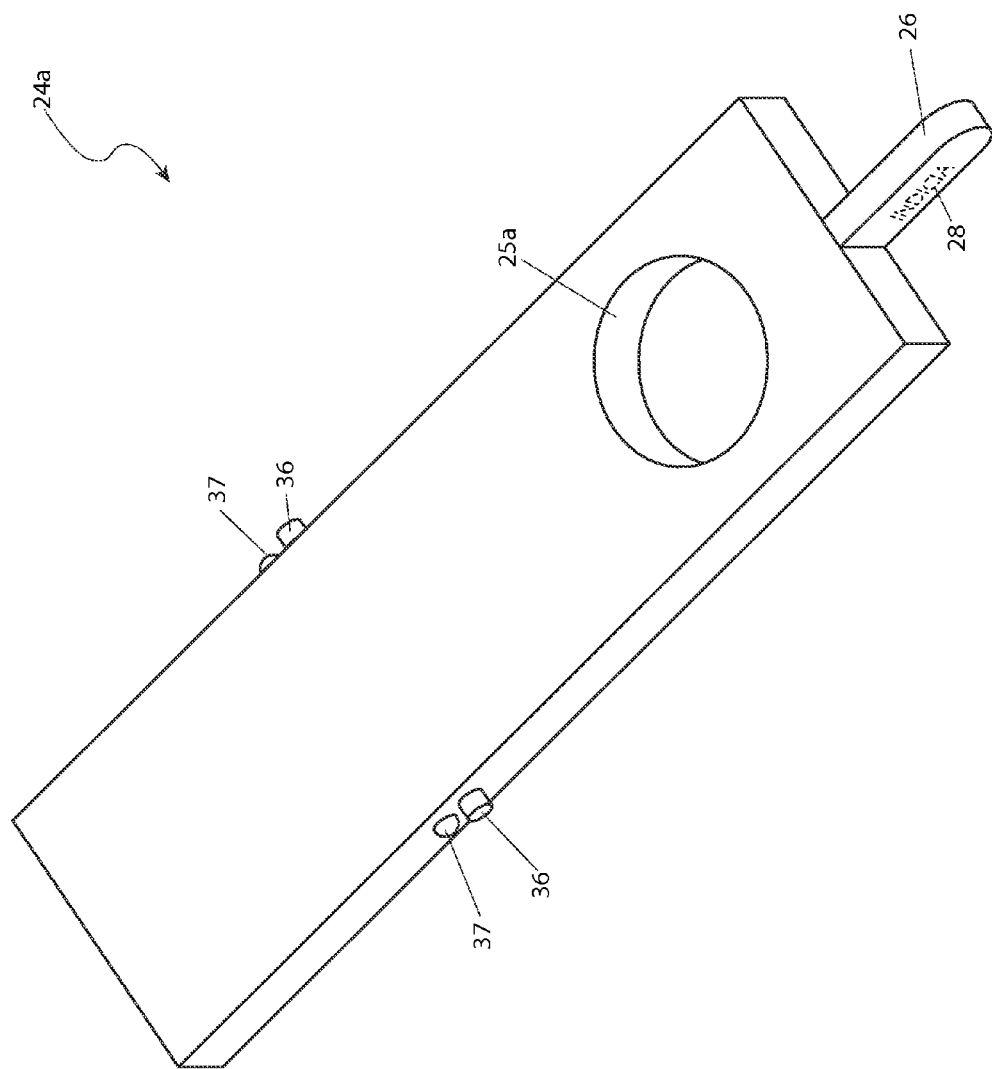

Referring now to FIG. 7, a close-up view of a dispenser plate portion 24a of the assembly 10, according to a preferred embodiment of the present invention, is disclosed. The first dispensing plate 24a is depicted here for illustration sake. However, said dispensing plates 24a, 24b, 24c, 24d, 24e are arranged top to bottom, respectively, having incrementally decreasing circular apertures 25a, 25b, 25c, 25d, 25e. Each dispensing plate 24a, 24b, 24c, 24d, 24e includes a forwardly extending integral handle portion 26 which provides convenient manual extension of a desired dispensing plate 24a, 24b, 24c, 24d, 24e. Said handle portions 26 are envisioned to provide printed or molded-in indicia 28 along side surfaces indicating a volume or other measurement of the dry ingredient 102 being dispensed.

All of the dispensing plates 24a, 24b, 24c, 24d, 24e comprise identical perimeter shapes, plastic or metal guide pins 36 which travel within the aforementioned guide slots 44, and corresponding rubber or plastic stop buttons 37 which engage the aforementioned stop slots 46 (see FIG. 5). The guide pins 36 and stop buttons 37 are located along opposing side surfaces of each dispensing plate 24a, 24b, 24c, 24d, 24e and are affixed via press-fit insertion, adhesives, or equivalent means. It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the assembly 10, it would be installed as indicated in FIG. 1. The method of mounting and preparing the assembly 10 for use may be achieved by performing the following steps: procuring a model of the assembly 10 being suitably sized for a particular family of dry ingredients 102 and having a desired number of hopper assemblies 20; assembling the hopper assemblies 20 together by inserting respective joint slot 40a, 40b and joint tab 42a, 42b portions; attaching slide 62 and mounting bracket 68 portions of the mounting assembly 60 to the outermost right and left assembled hopper assemblies 20 using the provided fasteners 90; attaching upper surface portions of the mounting brackets 68 to a superjacent cupboard structure 100 or other structure using additional fasteners 90; extending a hopper assembly 20 forwardly along the slide 62 and bracket 68 portions to a convenient loading position; loading the dry ingredient 102 into the hopper structure 30 by fully inserting each dispensing plate 24a, 24b, 24c, 24d, 24e until each respective stop button 37 "snaps" into the stop slot 46; raising the lid 34 to access an inner space portion of the hopper structure 30 by grasping and lifting the knob 35 upward and rearward; pouring a desired amount of dry ingredient 102 into the hopper structure 30 until obtaining a desired level as indicated in the window 48; closing the lid 34; pressing and sliding the hopper assembly 20 to the rearward position beneath the cupboard structure; repeating the previously described filling process for remaining hopper assemblies 20, as desired; and, printing or writing a name of each dry ingredient 102 upon respective labels 29. The assembly 10 is now ready for use to dispense the dry ingredients 102.

The method of utilizing the assembly 10 may be achieved by performing the following steps: selecting a hopper assembly 20 containing a desired dry ingredient 102 as indicated by a respective label 29; pulling the hopper assembly 20 outwardly from its recessed location below the cupboard structure; positioning an existing container beneath the delivery chute portion 32 of said hopper assembly 20; pulling at least one (1) dispensing plate 24a, 24b, 24c, 24d, 24e using respective handle portions 26 to accurately dispense a desired amount of the dry ingredient 102 onto the chute 32 and into the existing container; returning the dispensing plate(s) 24a, 24b, 24c, 24d, 24e to their rearward position until retained within the stop slot 46; repeating the dispensing process, if needed, to obtain a desired volume of dry ingredient 102; returning the hopper assembly 20 to the rearward position beneath the cupboard structure 100; repeating the above steps to dispense other dry ingredients 102, as needed, from additional hopper assemblies 20; and, benefiting from compact containment of various dry ingredients 102 while providing accurate dispensing thereof, afforded a user of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:
1. A dispensing assembly, comprising:
a plurality of hopper assemblies, wherein each said hopper assembly comprises:
a hopper body with a hopper interior;
a plurality of dispensing plates slidingly disposed within said hopper interior; wherein each successive plate is subjacent from each other and each said plate has an aperture and a pull tab extending outwardly therefrom;

a delivery chute subjacent said plurality of dispensing plates;

a locking tab disposed on a first vertical side of said hopper body; and, a groove disposed on second vertical side opposite said first vertical side of said hopper body, wherein each said locking tab is adapted to engaged and mate with said groove of an adjacent hopper body thereby conjoining each of said plurality of hopper assemblies; and, at least one mounting means configured for mounting said conjoined plurality of hopper assemblies to a support structure, comprising:

a slide portion affixed to an outermost side of said conjoined plurality of hopper assemblies; and, a mounting bracket portion attached to an opposing mounting location of said support structure adapted to engage and retain said slide portion;

wherein, within each said hopper body, each aperture of each said subjacent dispensing plate is smaller in volume than said aperture immediately above.

2. The dispensing assembly of claim 1, wherein each said hopper body further comprises a hopper assembly lid.

3. The dispensing assembly of claim 1, wherein each said hopper body further comprises a window located superjacent from said plurality of dispensing plates.

4. The dispensing assembly of claim 1, wherein each said dispensing plate further comprises at least one guide pin to locate each said dispensing plate within said hopper body and allow each said dispensing plate to move between a closed and an open position within said hopper body.

5. The dispensing assembly of claim 4, wherein each said dispensing plate further comprises at least one stop button to locate each said dispensing plate within said hopper body at said closed position within said hopper body.

6. The dispensing assembly of claim 5, wherein, within each said hopper body, each said aperture is in fluid communication with said hopper interior when each said dispensing plate is in said closed position.

7. The dispensing assembly of claim 5, wherein and each said aperture of each said dispensing plate is in fluid communication with said delivery chute when each said dispensing plate is in said open position.

8. The dispensing assembly of claim 1, wherein each said hopper interior is configured to receive a volume of a material therein.

9. The dispensing assembly of claim 8, wherein, within each said hopper body, each said dispensing plate of said plurality of dispensing plates dispenses a specific and different volume of said material corresponding to a volumetric size of each said aperture.

10. A dispensing assembly comprising a plurality of hopper assemblies, wherein each said hopper assembly comprises:

a hopper body with a hopper interior configured to receive a volume of a material therein;

a plurality of dispensing plates slidingly disposed within said hopper interior; wherein each successive plate is subjacent from each other and each said plate has an aperture, each said aperture of each said subjacent dispensing plate is smaller in volume than said aperture immediately above;

a delivery chute subjacent from said plurality of dispensing plates;

a hopper assembly lid; and, a window located superjacent from said plurality of dispensing plates;

wherein each said dispensing plate further comprises at least one guide pin to locate each said dispensing plate within said hopper body and allow each said dispensing plate to move between a closed and an open position within said hopper body.

11. The dispensing assembly of claim 10, wherein each said dispensing plate further comprises at least one stop button to locate each said dispensing plate within said hopper body at said closed position within said hopper body.

12. The dispensing assembly of claim 11, wherein, within each said hopper body, each said aperture of each said dispensing plate is in fluid communication with said delivery chute when each said dispensing plate is in said open position.

13. The dispensing assembly of claim 10, wherein, within each said hopper body, each of said plurality of dispensing plates dispenses a specific and different volume of said material corresponding to a volumetric size of each said aperture.

14. The dispensing assembly of claim 10, wherein each said hopper assembly further comprises a locking tab disposed on a first vertical side of said hopper body; and a groove disposed on second vertical side opposite said first vertical side of said hopper body, wherein each said locking tab is adapted to engaged and mate with a said groove of an adjacent hopper body thereby conjoining each of said plurality of hopper assemblies.

15. The dispensing assembly of claim 14, further comprises at least one mounting means configured for mounting said conjoined plurality of hopper assemblies to a support structure.

16. The dispensing assembly of claim 15, wherein said at least one mounting means further comprises:

a slide portion affixed to an outermost side of said conjoined plurality of hopper assemblies; and, a mounting bracket portion attached to an opposing mounting location of said support structure adapted to engage and retain said slide portion.

17. A dispensing assembly, comprising:

a plurality of hopper assemblies, wherein each said hopper assembly comprises:

a hopper assembly lid;

a hopper body with a hopper interior configured to receive a volume of a material therein;

a plurality of dispensing plates slidingly disposed within said hopper interior between a closed and an open position;

wherein each successive plate is subjacent from each other, each said plate has an aperture located there on, wherein each said aperture of each said subjacent dispensing plate is smaller in volume than said aperture immediately above, and each said dispensing plate has a pull tab extending outwardly therefrom;

a delivery chute subjacent from said plurality of dispensing plates and in fluid communication with each of said plurality of dispensing plates when said plates are in said open position;

a window located superjacent from said plurality of dispensing plates;

a locking tab disposed on a first vertical side of said hopper body; and, a groove disposed on second vertical side opposite said first vertical side of said hopper body, wherein each said locking tab is adapted to engaged and mate with said groove of an adjacent hopper body thereby conjoining each of said plurality of hopper assemblies; and, at least one mounting means configured for mounting said conjoined plurality of hopper assemblies to a support structure, comprising:
a slide portion affixed to an outermost side of said conjoined plurality of hopper assemblies; and,
a mounting bracket portion attached to an opposing mounting location of said support structure adapted to engage and retain said slide portion.

* * * * *